United States Patent
McGowan et al.

(10) Patent No.: US 9,961,993 B2
(45) Date of Patent: May 8, 2018

(54) WALL MOUNT FURNITURE WITH CABLE CONCEALMENT

(71) Applicant: Ameriwood Industries, Inc., Wright City, MO (US)

(72) Inventors: Kevin McGowan, St. Charles, MO (US); Steve Wahrhaftig, West Chester, PA (US); Corey Neudeck, Richburg, NY (US)

(73) Assignee: Ameriwood Industries, Inc., Wright City, MO (US)

( * ) Notice: Subject to any disclaimer, the term of this patent is extended or adjusted under 35 U.S.C. 154(b) by 0 days. days.

(21) Appl. No.: 14/928,391

(22) Filed: Oct. 30, 2015

(65) Prior Publication Data

US 2016/0120304 A1     May 5, 2016

Related U.S. Application Data

(63) Continuation-in-part of application No. 13/893,119, filed on May 13, 2013, now Pat. No. 9,631,769.

(60) Provisional application No. 61/645,792, filed on May 11, 2012.

(51) Int. Cl.
| | | |
|---|---|---|
| *A47B 21/06* | (2006.01) | |
| *A47B 21/00* | (2006.01) | |
| *A47B 5/06* | (2006.01) | |
| *A47B 17/00* | (2006.01) | |
| *A47B 97/00* | (2006.01) | |
| *F16M 13/02* | (2006.01) | |

(Continued)

(52) U.S. Cl.
CPC ............... *A47B 21/06* (2013.01); *A47B 5/06* (2013.01); *A47B 17/00* (2013.01); *A47B 21/00* (2013.01); *A47B 81/06* (2013.01); *A47B 83/001* (2013.01); *A47B 2097/003* (2013.01); *A47B 2200/0069* (2013.01); *F16M 13/02* (2013.01)

(58) Field of Classification Search
CPC ... A47B 21/06; A47B 2021/066; A47B 37/00; A47B 21/0314; A47B 81/06; A47B 2097/003; B25H 1/12; H05K 5/00; H05K 5/02; H05K 5/0217; H05K 5/0004; H05K 5/03; G06F 1/181; G06F 1/16; H04N 5/64; F16M 13/02
USPC ..... 248/56, 68.1, 71, 500; 312/223.3, 223.6, 312/245, 197, 111, 194, 321.5; 108/50.01, 50.02, 92, 93; 217/69
See application file for complete search history.

(56) References Cited

U.S. PATENT DOCUMENTS

| | | | | |
|---|---|---|---|---|
| 1,543,980 | A * | 6/1925 | Blood | A47B 77/02 126/214 B |
| 3,400,847 | A * | 9/1968 | Stute | F16B 12/46 217/69 |

(Continued)

FOREIGN PATENT DOCUMENTS

WO    WO 2013091636 A1 * 6/2013 ......... A47B 87/0292

*Primary Examiner* — Stanton L Krycinski
*Assistant Examiner* — Taylor L Morris
(74) *Attorney, Agent, or Firm* — Lewis Rice LLC

(57) ABSTRACT

Furniture systems, such as desks, that can be stand-alone wall mounted, wall mounted with furniture positioned in front, or attached/mounted to furniture, and that also accommodate differing types of computers or electronics and wires in an efficient and visually appealing manner. Specifically, the furniture includes a concealment pocket which provides that cabling and associated structures can be hidden above the floor.

5 Claims, 2 Drawing Sheets

(51) Int. Cl.
*A47B 81/06* (2006.01)
*A47B 83/00* (2006.01)

(56) References Cited

U.S. PATENT DOCUMENTS

| | | | | |
|---|---|---|---|---|
| 4,094,256 A * | 6/1978 | Holper | ............... | A47B 21/06 108/33 |
| 4,116,507 A * | 9/1978 | Marusiak, Jr. | ......... | A47B 81/00 237/79 |
| 4,245,871 A * | 1/1981 | Rex | ............... | A47B 81/06 312/198 |
| 4,372,629 A * | 2/1983 | Propst | ............... | A47B 21/06 248/52 |
| 4,535,703 A * | 8/1985 | Henriott | ............ | A47B 21/06 108/50.02 |
| 4,792,881 A * | 12/1988 | Wilson | ............. | A47B 21/06 312/223.6 |
| 5,121,698 A * | 6/1992 | Kelley | ............. | A47B 21/06 108/143 |
| 5,231,562 A * | 7/1993 | Pierce | ............. | A47B 21/06 108/50.02 |
| 5,429,431 A * | 7/1995 | Olson | ............... | A47B 21/06 108/23 |
| 5,460,101 A * | 10/1995 | Garbutt, Sr. | ......... | A47B 5/04 108/40 |
| 5,584,546 A * | 12/1996 | Gurin | ............. | A47B 21/00 16/19 |
| 5,640,912 A * | 6/1997 | Diffrient | ........... | A47B 21/06 108/23 |
| 5,820,238 A * | 10/1998 | Lambright | .......... | A47B 46/00 312/291 |
| 5,833,332 A * | 11/1998 | Marshall | ........... | A47B 21/06 312/223.3 |
| 5,848,711 A * | 12/1998 | Schmit | ............. | A47B 96/00 211/187 |
| 5,971,509 A * | 10/1999 | Deimen | ............. | A47B 21/06 108/26 |
| 5,994,644 A * | 11/1999 | Rindoks | ............ | A47B 21/06 108/50.02 |
| 6,158,829 A * | 12/2000 | Nielsen | ............ | A47B 46/00 312/208.1 |
| 6,176,561 B1 * | 1/2001 | Roels | ............... | A47B 21/06 108/50.02 |
| 6,216,606 B1 * | 4/2001 | Kathardekar | ........ | A47B 21/06 108/50.02 |
| 6,382,749 B1 * | 5/2002 | Stetson | ............ | A47B 46/005 312/308 |
| 6,402,271 B1 * | 6/2002 | Kelley | ............. | A47B 21/00 312/196 |
| 6,419,330 B1 * | 7/2002 | Lechman | ........... | A47B 17/00 312/194 |
| 7,111,852 B2 * | 9/2006 | Woods | ............. | B26B 3/00 280/47.34 |
| 7,338,139 B2 * | 3/2008 | Peter | ............... | A47B 77/08 312/107 |
| 7,445,300 B2 * | 11/2008 | Collins | ............ | A47B 97/00 312/249.8 |
| 7,472,971 B2 * | 1/2009 | Schmieder | .......... | A47B 81/06 312/223.3 |
| 8,087,738 B2 * | 1/2012 | Henriott | ........... | A47B 21/06 108/50.02 |
| 2003/0136313 A1 * | 7/2003 | Griepentrog | ........ | A47B 83/001 108/50.02 |
| 2003/0193276 A1 * | 10/2003 | Welborn | ............ | A47B 81/06 312/198 |
| 2004/0222721 A1 * | 11/2004 | Kelley | ............. | A47B 45/00 312/205 |
| 2007/0018543 A1 * | 1/2007 | Cribbs | ............. | A47B 81/06 312/223.3 |
| 2007/0159035 A1 * | 7/2007 | Mullen | ............. | A47B 46/005 312/245 |
| 2007/0235222 A1 * | 10/2007 | Hubbard | ............ | A47B 21/06 174/480 |
| 2008/0168930 A1 * | 7/2008 | Calero | ............. | A47B 21/0314 108/50.02 |
| 2009/0294605 A1 * | 12/2009 | Smith | ............... | A47B 81/06 248/158 |
| 2009/0310291 A1 * | 12/2009 | Willburn | ........... | A47B 21/06 361/679.22 |
| 2011/0012481 A1 * | 1/2011 | Becker | ............. | A47B 81/06 312/204 |
| 2011/0198972 A1 * | 8/2011 | Kirkeby | ............ | A47B 81/06 312/7.2 |
| 2012/0206865 A1 * | 8/2012 | Morris | ............. | F16M 13/02 361/679.01 |
| 2013/0206446 A1 * | 8/2013 | Briede | ............. | H05K 5/03 174/66 |
| 2016/0104982 A1 * | 4/2016 | Ho | ............... | A47B 21/06 439/529 |

* cited by examiner

WALL MOUNT FURNITURE WITH CABLE CONCEALMENT

CROSS REFERENCE TO RELATED APPLICATION(S)

This application is a Continuation-in-Part (CIP) of U.S. Utility patent application Ser. No. 13/893,119, filed May 13, 2013, which claims the benefit of U.S. Provisional Patent Application Ser. No. 61/645,792, filed May 11, 2012. The entire disclosure of both documents is herein incorporated by reference.

BACKGROUND

1. Field of the Invention

This disclosure relates generally to furniture devices, and more particularly, to wall mounted furniture, for usage with computers, books, electronic devices, desk items and audio visual equipment.

2. Description of Related Art

Historically, electronic equipment was, and still largely is, located and stored on some type of shelving system, console, or stand for convenient operation and use. For example, a home entertainment center (or stereo console) is a piece of furniture seen in many homes, which houses major electronic items, such as a television set, a VCR and/or DVD player, stereo components (such as an AM/FM tuner, multi-disc compact disc changer, record player, one or more cassette players, and graphic equalizer), and cable or satellite television receivers. These electronics typically require some type of cords, cables and/or wires (which are generally referred to herein as cables) either interconnected between the electronics or connected to an electrical outlet. Typically though, the electronics are spatially separated such that these wires are on top of the furniture and are easily viewable and visually unappealing. In the alternative, large entertainment centers and stands were used to house all the electronics and hide the wires. However, such entertainment centers and stands were often very bulky taking up a lot of excess space and greatly contrasted with the appearance of the wall.

The commonality of flat panel televisions and computer monitors has substantially reduced the need for these large pieces of furniture. Furthermore, these flat panel televisions are very thin in comparison to the older, conventional cathode ray tube (CRT) or projection televisions, making them suitable for wall-mounting. As a result, smaller pieces of furniture can be utilized to house the remaining electronics.

Wall-mounting televisions, however, have problems of their own. While flat panel televisions are much smaller than conventional CRT televisions, they are still very heavy. Thus, flat panel televisions are typically mounted to steel braces which are in turn mounted to wall studs with large screws. Because the flat panel television is mounted to the wall, it is separated from the outlet and the other interconnected electronics (e.g., cable box, DVR player, surround system, etc.). Generally, the components, therefore, lack an efficient wire management system. Thus, visually unappealing exposed wires often run from the flat panel televisions to the outlet and the associated electronics and simply hang or dangle along the wall. While cables can be run through walls to avoid the unsightly mess, this can often require more construction expertise and cost to carry out compared to simply installing the television and mount.

Over the years the home office has also transformed from elaborate desks and bookcases to a more simplistic arrangement usually comprising of a computer, a few electronic devices and a few reference books. Like the audio-video equipment discussed above, it is common for electronic items located on a desk to be stored in plain sight for ease of use. The electronic devices housed on a desk often need cords to provide, power and interconnection between such devices and/or related peripherals. These cables are often considered unsightly and have a tendency to become tangled with other cables thereby creating a frustrating user experience. Additionally, the user often has a need to disconnect some of the cables; for instance, to take a laptop charger for travel.

Existing furniture for computer use are generally of two types. The first is a solid standalone unit with an accompanying hutch spaced above the desk and mounted to a wall to support the weight of the hutch. The second is a desk-hutch combination with a solid rear section connecting the hutch to the desk portion. Generally, neither of the two types include a cord management arrangement that conceals cables, or power stripes, except by simply hiding them under the desk on the floor and providing holes for cables to pass through the desk. Certain structures may include built in power outlets or power strips, but these systems do not provide for management of cables, they merely build in the cabling.

Some desk configurations include a hutch mounted and secured to a wall. Such mounting generally comprises installation by using bolts (or other fasteners) attached to the studs of the wall, or anchors such as a toggle bolt, either way, creating unsightly holes in the wall. Further, the mounting must be very secure as such hutches are often very heavy and the load is borne entirely by the wall. Electronic devices that require cables to extend between the two components can also generally not be mounted on both desk elements without unsightly cable connections.

Portable electronic devices such as laptop computers, tablets, e-readers, smartphones, cell phones, monitors, printers, headphones, smartwatches, fitness trackers, and related devices/peripherals also generally require charging and/or a wired connection to other items at certain times. Primarily this is when they are not being transported by their owner. Exposed charging and connection cables are unsightly and are usually left in an exposed arrangement for a variety of reasons including the physical construction of a desk which does not allow for cables to run from one section to another and so they can be easily accessed. Modifications to a piece of furniture to run such cabling would irreversibly change the furniture. Furthermore, transformers (i.e. "power blocks") such as those commonly used in a laptop charging cables and a number of computer peripherals such as, but not limited to, printers are often difficult to maneuver and often do not allow the user to utilize the existing holes in the desk (if present), as they need to be on one side of the hole or the other, and generally cannot be suspended in the air due to their weight.

Accordingly, there exists a need for a desk and other furniture that can support common desk items by being attached to a wall to provide a reduced footprint and that can also house cables in a concealed arrangement while simultaneously allowing the user relatively easy access to such cables.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

In an embodiment, there is described herein a piece of furniture comprising: a first side support and an opposing second side support with a writing surface extending therebetween, said writing surface having a front side and an opposing back side; a concealment compartment disposed below said writing surface and between said first side support and said second side support and having a front side and an opposing back side, said back side being open such that when said desk system is installed against a wall, said wall is generally flush with said open back of said compartment such that said wall generally closes said open back side; and an opening at the top of said concealment compartment configured such that cables stored in said concealment compartment may be connected to devices on said writing surface.

In an embodiment, the furniture further comprises an opening in said concealment compartment configured such that cables stored in said concealment compartment may be plugged into a wall power receptacle through said opening.

In an embodiment of the furniture, the front side of said concealment compartment comprises a removable cover.

In an embodiment, the furniture further comprises a mounting bracket extending from said writing surface to said concealment compartment.

In an embodiment of the furniture, the desk is mounted to a wall using said mounting bracket.

In an embodiment of the furniture, the mounting holes are spaced about four inches apart.

In an embodiment of the furniture, the concealment compartment has a hingedly attached cover.

In an embodiment of the furniture, the concealment compartment is configured to accommodate a plurality of transformer blocks connected to a power strip therein.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

DESCRIPTION OF THE PREFERRED EMBODIMENTS

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

The furniture (100) of the present disclosure has numerous advantages over the currently known units and systems which display and store electronic devices, books and desk items. Specifically, the present pieces of furniture (100) provide for a piece of furniture (100) which gives the indication that the furniture (100), and associated electronics, have been built into a wall (101) (including hiding cords), without the piece of furniture (100) or the electronics having been built into the wall (101).

Figure 1:
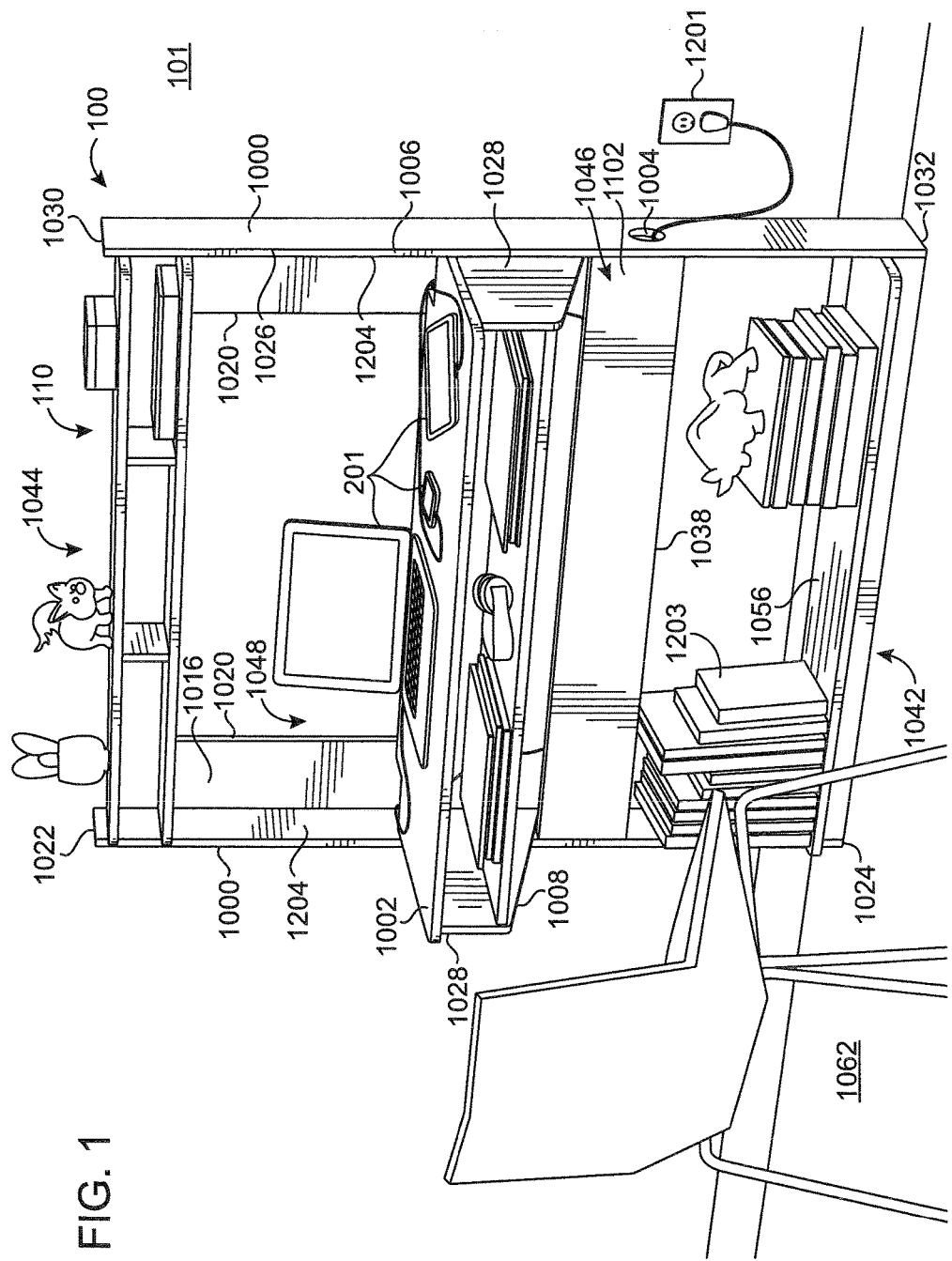
FIG. 1 provides a perspective view of an assembled piece of furniture utilizing a concealment area, specifically, a desk is provided.
Figure 2:
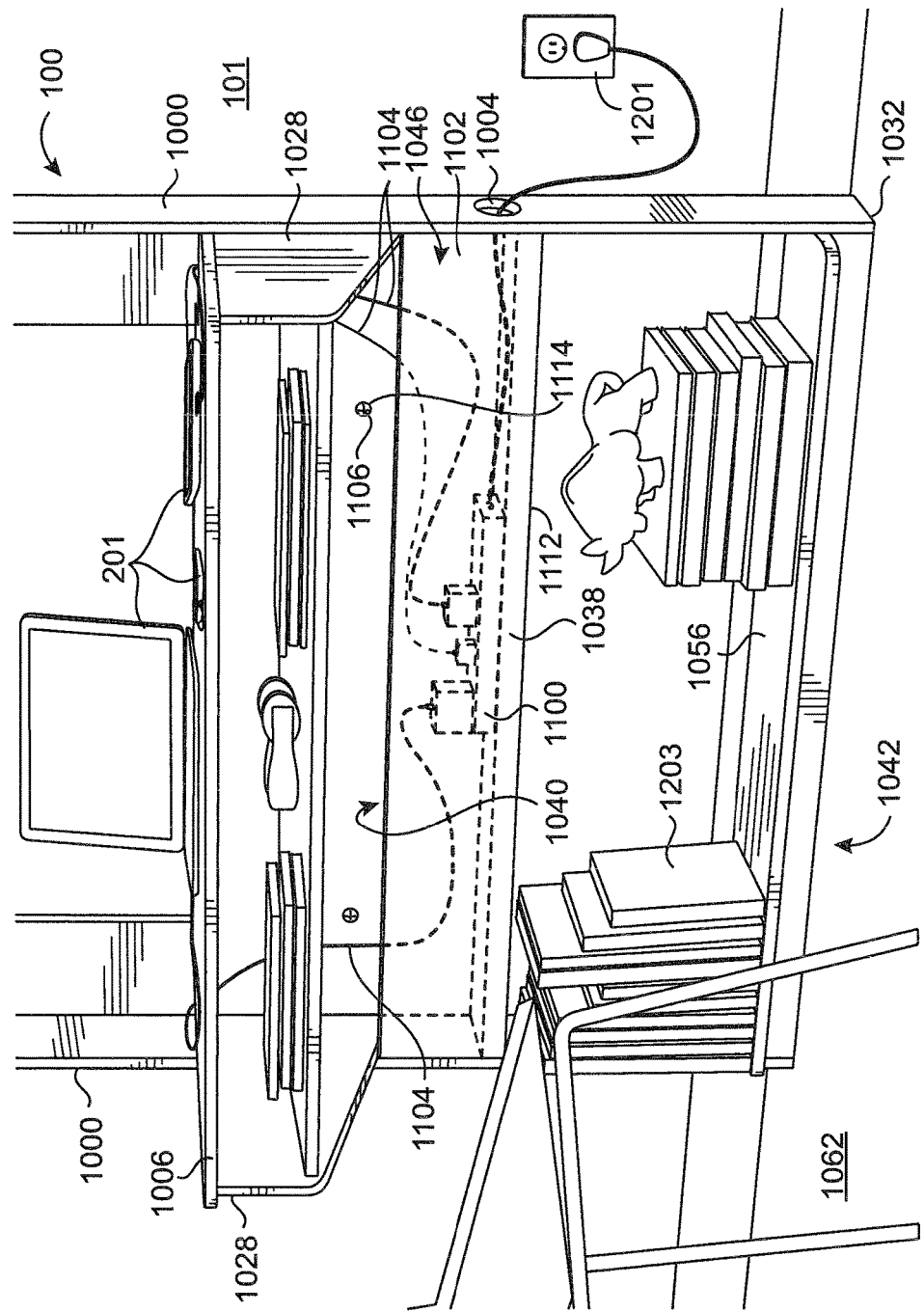
FIG. 2 provides a perspective view of the lower portion of the embodiment of FIG. 1. Items in the concealment area are shown in shadow.

Described herein, among other things, is a wall-mounted piece of furniture (100) such as a desk as depicted in FIGS. 1 and 2 having a concealed compartment (1046) for housing cables (1104) which generally uses the wall (101) as part of the concealed compartment (1046) and which can provide for a broad access point. This is generally done by configuring an appropriately-sized compartment (1046) such that when the furniture (100) is mounted to a wall (101), the wall (101) is one of the sides of the compartment (1046) and the compartment (1046) is accessible from a large portion of the furniture (100).

In some embodiments of the furniture (100) of the present disclosure, an integrated weight-bearing base gives the appearance of a piece of furniture (100) that has been built into a wall (101) but is, instead, simply lightly secured to the wall (101). Specifically, the furniture (100) is designed in such a way that when placed in contact with a wall (101), the wall (101) is not bearing the downward force from the furniture (100) or objects on the furniture (100), and instead the feet of the furniture (100) are bearing most of the weight. The wall (101) mount generally serves only to inhibit the furniture (100) from toppling away from the wall (101). In other words, the vertical forces are primarily transferred to the base (1024) and (1032) of the unit and attachment to the wall (101) is primarily for horizontal forces. Further, the furniture (100) gives the appearance that it is part of the wall (101) to which it is attached, and enhances that illusion by hiding cabling and associated electrical components in a hidden concealment compartment (1046).

The furniture (100) of the present disclosure efficiently hide and manage the cables (1104) of electronic devices, while maintaining the appearance of a wall mounted desk or similar piece of built-in or constructed furniture. In other words, the furniture (100) allows for cables (1104) and larger components such as transformers, power strips (1100), and battery backups to be mostly hidden from the exposed, exterior surface of the furniture (100) as if the cables (1104) had been concealed in the wall (101) when the furniture (100) was installed. However, the cables (1104) are, in fact, concealed outside the wall (101) in the furniture (100) which is also not built in.

This disclosure will discuss throughout its text concealing "cables" (1104). It is generally recognized that electronic equipment utilizes a number of forms of wired connectors and components. These are all jointly referred to herein as "cables" and that term is intended to mean things such as, but not limited to, power cables, communication cables, charging cables, extension cables, power strips, electrical transformers, battery backups and combinations of the above that are commonly used to connect electrical components to each other for the communication of power, data or other electric signals.

In order to provide for cable concealment, the furniture (100) will generally create a pocket or compartment (1046) with a cover panel (1102) between the exterior of the furniture (100) and an existing wall (101), and a pass-through gap (1040) allowing cables (1104) to run up to electronics (201) located on the piece of furniture (100) from the compartment (1046). In some embodiments, the cover panel (1102) can be added and removed with ease and without the need for tools. In other embodiments, the cover panel (1102) is mounted to internal hinges which allows the user access to the contents of the pocket. In other variations the outward facing containment cover (1102) is attached to the side posts (1000) via a tongue and grove arrangement. Still further cover (1102) may be mounted in a generally immobile arrangement as is depicted in FIGS. 1 and 2.

FIGS. 1 and 2 show two images of an embodiment of a piece of furniture (100), specifically a desk system from a perspective view. FIG. 1 shows the entire piece of furniture (100) in the fashion it would be installed. It is, thus, adjacent to and in contact with the wall (101) of a structure. While FIGS. 1 and 2 depict a piece of furniture (100) that is generally intended to be considered a "desk" it should be recognized that the furniture (100) can assume a variety of shapes an structures such as, but not limited to, desks, bookcases, fireplaces, and entertainment centers. The only restriction on the furniture (100) is that it is generally intended to house some form of electronic component (usually which utilizes central power) somewhere on it.

In the embodiment of FIGS. 1 and 2, the furniture (100) generally comprises a frame (110) onto which structures forming the concealment area (1046) as well as other sub-assemblies are positioned. The frame (110) will mount some form of sub-assembly onto which electronics are to be placed. This can comprise anything from a simple horizontal shelf, to a vertical bracket system designed to connect to and support a large flat screen television. In the depicted embodiment, this sub-assembly is the desk portion (1048) which includes a top writing surface (1002) and a lower storage shelf or drawer (1008).

The frame (110) of the piece of furniture (100) generally is formed from two vertical side posts (1000) positioned on opposing sides of the structure which define the width of the system. The sides (1000) are generally parallel to each other and extend vertically from their a bottom surfaces (1024) and (1032) to their top surfaces (1022) and (1030) with a length therebetween. The side posts (1000) are generally planar, but this is by no means required. The side post inner surfaces (1016) and (1026) are generally perpendicular to any shelves (such as sub-assemblies (1044) and (1042)) as well as the writing surface (1002) of the desk assembly (1048). Further, they are also generally perpendicular to the back supports (1020) which are also generally perpendicular to the writing surface (1002). The bottom surfaces (1024) and (1032) of the vertical side posts are generally designed to be weight bearing and will be placed on a floor (1062) or other surface when the furniture (100) is positioned. To assist in stability, weight bearing, and floor (1062) contact, the bottom surfaces (1024) and (1032) may include feet of any type known to those of ordinary skill in the act to protect flooring from direct contact with furniture (100) and to allow for leveling.

The side posts (1000) are generally connected perpendicularly to rear posts (1020) which are also generally vertically arranged. In the depicted embodiment, that design provides for each combination of side post (1000) and rear post (1020) to form a "corner" of a frame (110) for the piece of furniture (100). This allows the furniture (100) to have a generally open back allowing the wall (101) to be visible through the furniture (100). While not required, this arrangement can enhance the appearance that the furniture (100) is built into the wall (101). In an alternative embodiment, the rear posts (1020) are replaced with a single monolithic piece extending the width of the back of the furniture (101) and to which both side posts (1000) are attached.

The desk sub-assembly (1048) will generally be arranged to extend out from the wall (101) in generally horizontal arrangement. The desk (1048) is generally attached within the L of each of the corners formed from the sides (1000) and rear posts (1020). In the depicted embodiment, the desk (1048) comprises an uppermost writing surface (1002) which generally defines the depth of the desk (1048), as it is the deepest component. The writing surface (1002) is generally planar and horizontal allowing a human user to stand or sit at its front side (1006) and manipulate objects on its uppermost major face. Below the writing surface (1002) is a shelf surface (1008) which acts to form a storage area below the writing surface (1002). The shelf surface (1008) and writing surface (1002) are connected together by side supports (1028). This combined structure may also have at the rear a portion of the mounting bracket (1112), a separate rear panel, or parts of other structures to form a back. Having a rear panel behind the shelf surface (1008) of the desk (1048) is generally preferred as this structure is intended to hold objects used in the desk (1048) and as such the user may not want them to contact the wall (101) or fall into the concealed compartment (1046).

As should be apparent from the FIGS, the piece of furniture (101) has a generally rectilinear parallelepiped appearance common in most pieces of furniture. It also has a generally rectangular footprint. However, the footprint is defined mostly by the horizontal extension of the desk assembly (1048) and it is preferable that the desk (1048) not have any legs or supports at its front end (1006). This enhances the illusion that the furniture (100) is built into the wall (101) as it appears to be suspended from the wall (101) as opposed to simply being adjacent to it.

Located below the desk sub-assembly (1048) is the cable concealment area (1046). The cable concealment area (1046) will generally be towards the back of the piece of furniture (100) and will often be constructed to be within the frame (110) (e.g. not horizontally extending beyond the frame (110) as the desk (1048) does). In some embodiments the cable concealment area (1046) is enclosed on 4 sides although a portion of the $5^{th}$ or $6^{th}$ side may be covered. The cable concealment area (1046) is generally in the form of a vertical pocket shelf whereby there is a shelf (1038) defining the lower portion of the pocket upon which objects in the concealment area (1046) will be placed. The objects are concealed from view by a front concealing panel (1102).

Generally the inner surface of the right post (1026) and the inner surface of the left post (1016) will form the sides of the pocket shelf (1038). This provides for a hollow volume to exist between the concealment cover (1102) and the wall as is best seen in FIG. 2. As can be seen in FIG. 1, the pocket shelf (1038) is generally hidden by the concealing panel (1102), particularly when positioned as is shown in the FIGS. so as to be generally aligned with the front edges of the side posts (1000), appears to simply be a solid component supporting the desk assembly (1046). Generally, the existing wall (101) will be directly against the backside of the pocket shelf (1038) forming the back of the concealed compartment (1046). However, this is not strictly necessary and in an alternative embodiment, the concealed compartment (1046) may include a backside.

In an embodiment, the backside is provided by a portion of the mounting bracket (1112). As is best visible in FIG. 2, above the top of the concealment cover (1002) there may be positioned a mounting bracket (1112) which may form at least a portion of the backside of the concealed compartment (1046) and/or the backside of the desk assembly (1046). The mounting bracket (1112), in an embodiment, may extend the entire distance covering the wall behind the concealment cover (1102) and above the shelf (1008) although the depicted embodiment does not show this. A large mounting bracket (1112) is generally not preferred as the mounting bracket (1112) will deny access to a power outlet (1201) or other structure in the wall (101) behind the concealment compartment (1046) that may be desired to have access to. Instead, the mounting bracket (1112) is generally provides for two purposes. One is to provide a uniform appearance of the material of the furniture (100) from the top of the desk (1048) to the bottom of the concealed compartment (1046) and the other is to provide a surface which is generally coplanar with the wall (101) to allow for the furniture (100) to be mounted to the wall.

In some embodiments the mounting bracket (1112) comprises a set of mounting holes (1114) for fasteners (1106). In some embodiments the mounting holes (1114) are spaced about 4" apart from one another. The diameter and depth of the mounting holes (1114) is determined by the material utilized for the mounting bracket (1112). In certain embodiments the mounting bracket (1112) is located within the concealment area (1046) and is thereby usually unable to be seen by a user at average eye-level. In the depicted embodiment, the mounting brackets (1112) serve to hide the visible portion of the wall (101) below the writing surface (1002) and above the cable concealment area (1046).

In the depicted embodiment, the piece of furniture (100) is not positioned over a power outlet (1201). Instead, located on the right side post (1000) (or alternatively or additionally on the left side post) (1000) is a cable access panel (1004) which provides access to the cable concealment area (1046) for wires and cables which need to pass from the area generally covered by the furniture (100). In some embodiments the cable access panel (1004) includes a removable grommet to allow for cables to exit or enter the concealment area (1046). The access panel (1004) will generally be used if an existing wall outlet (1201) is positioned outside the part of the wall (1101) over which the furniture (100) is placed.

An access panel (1004) is generally not necessary in embodiments where the electrical outlet (1201) would be located in the area upon which the furniture (100) is placed. In this type of embodiment, the electrical outlet (1201) will generally be accessed directly from inside the concealment area (1046), specifically from above the pocket shelf (1032). As contemplated above, if the electrical outlet (1201) is behind the piece of furniture (100), it is possible to position the pocket shelf (1038) so that the outlet (1201) will generally fall at a height where it is below the bottom of the mounting bracket (1112), but above the shelf (1038). This allows the outlet (1201) to be accessed from within the concealment area (1046) and conceals the outlet (1201) itself. As electrical outlets (1201) are often at a generally common elevation from the floor (1062), it can be possible to position the shelf (1038) in such a manner as to inhibit the shelf (1038) from being at the height of the outlet (1201). However, as shown in the embodiment of FIG. 1, this is not required and it may be the case that the pocket shelf (1038) is not at the correct height to hide the outlet (1201). In this case, the access point (1004) is used and the furniture (100) is posited near or adjacent the outlet (1201) as shown.

The pocket shelf (1038) is used to provide a concealed volume for the storage and organization of cables (1104) commonly needed for the use of modern electronic displays such as televisions and computer monitors or other things on or in the desk assembly (1048). The pocket shelf (1038) hides these items by providing a concealment cover (1102) which creates a volume hidden from the exterior of the furniture (100) by the concealment cover (1102) when the items are resting on the shelf (1038), as well as when they extend downward to it. Depending on embodiment, the concealment cover (1102) may extend all the way up to the desk area (1048) completely hiding the internal volume from view from the front.

Alternatively and preferably, since the desk area (1048) will generally extend a significant distance from the wall (101), it is possible to still conceal the concealment area (1046) volume while leaving a gap (1040) between the top of the concealment cover (1002) and the desk (1048) as depicted in FIGS. 1 and 2. This gap (1040) is generally not readily visible from the front of the furniture (100) and allows for cables (1104) to enter the concealment area (1046) from under the desk assembly (1048). Specifically if the user was to place a keyboard tray under the shelf (1008) at the bottom of the desk assembly (1048), the keyboard cable could go through this gap (1040) and onto the packet shelf (1038).

It should be apparent that while the cables (1104) can be visible in this gap (1040), they generally are not readily visible. In the first instance as generally one would not be looking at the piece of furniture (100) from a height less than the height of the desk (1048) and would instead be looking somewhat downward onto it. Thus, the desk (1048) would block line of sight to the gap (1040) in many cases. Even where it does not, the presences of the mounting bracket (1112) serves to provide for illusion that the frame (110) actually extends from the writing surface (1002) to the pocket shelf (1038) because the material of the furniture (100) appears continuous.

Specifically, as can be seen best in FIG. 2, if one looks directly at the furniture (100) from below the height of the desk (1048), the user first sees the desk (1048) itself, then the mounting bracket (1112), and then the concealment cover (1102). As these objects will generally all be made of the same material and have the same finish, the three will flow together and appear to form a continuous piece. In particular, the mounting bracket (1112) and the concealment cover (1002) are not readily seen as being at different distances from the user. This can be particularly true if certain finishes (such as flat black) are used on both pieces.

In order to use the pocket shelf (1038), cables (1104) may run into the concealment area (1046) from the top. This may be accessed, as discussed above, from the gap (1040) present under the desk assembly (1048). Additionally or alternatively, the writing surface (1002) of the desk (1048) will generally contain a cable access area (1204) to allow access to the volume of the concealment area (1046) from the top. In some embodiments such as that shown in FIG. 1 the cable access (1204) area is a grommet cut into the writing surface (1002).

However, in an alternative embodiment the access area (1204) is a gap left between the back of the desk (1048) and the wall (101) which runs the entire width of the writing surface (1002) and frame (110). This gap will generally be sufficient to allow for a relatively large object such as a power strip or power transformer to be placed therethrough (e.g. 2-3 inches). The area (1204) may be covered with a temporary cover (not shown) which may cover all or a portion of the area (1204). However that is generally not necessary The area (1204) is designed to allow for cables to travel from the writing surface (1002) to the concealment area (1046) below the writing surface (1002) providing an arrangement not particularly different from an open trough.

As should be apparent, the furniture (100) provides for a number of benefits for cable (1104) concealment. In the first instance, the concealment area (1046) is generally quite large as it can be deep enough to handle a large power strip (1100), electrical transformer, or similar device (e.g. 2, 3, 4, 5, 6, 7 or more inches deep (from the wall (101))) and can also have a height sufficient to cover the devices and extra cables. Further, as the concealment area (1046) can be accessed via the gap (1040) which runs substantially the entire length of the backside of the furniture (100), cables running from electronics (201) on the desk (1048) (e.g. a computer monitor) can be directed straight back against the wall (101) where they can then pass through the gap (1040) to enter the concealment area (1046). Within the concealment area (1046), the cables (1104) can then turn to go wherever they need to go to connect. This means that visible cabling is generally limited to the cable necessary to go straight back from the device (201) on the desk (1048) to the area (1204) and then directly downward to the gap (1040).

In the embodiment of the FIGS, the access area (1204) does not run the entire length of the backside, but instead comprises two holes arranged at the two back corners of the writing surface (1002). The corners are preferred as they are generally concealed by the side posts (1000) making the holes a little less apparent. Further, having two allows for the cables (1104) to run either direction from electronics (201) on the writing surface (1002).

It should be apparent that the above describes the most relevant aspects of the furniture (100) when it comes to cable concealment. Specifically, the cables (1104) are generally concealed by allowing them to be hidden on the pocket shelf (1038) between the concealment cover (1102) and the wall (101). Cables (1104) are only visible when it is necessary for them to extend to an object outside the concealment volume and this is generally accomplished using the smallest possible distance of cable run. Further, as cables (1104) are stored on the pocket shelf (1038), they are generally not at a user's feet where they can be in the way, and can be more easily viewed from the front of the furniture (100). Instead, only the portion of the cable (1104) on the writing surface (1002) and visible above the gap (1040) can be seen. This provides the illusion that the cables (1104) are in fact stored in the wall (101). The suspension of the desk assembly (1048) without front supports or a large side wall enhances this illusion as the area under the desk (1048) is clearly visible, and the cables (1104), which have previously been stored at the user's feet in this type of arrangement, are not visible.

In some embodiments, in order to enhance the "built-in" appearance of the piece of furniture (100) and emphasize the fact that cables (1104) are hidden, there is included a lower shelf assembly (1042) extending horizontally between the inner surface of the right side post (1028) and the inner surface of the left side post (1016). In most embodiments, the lower shelf (1056) has around a zero degree incline with the floor (1062), in other words the lower shelf (1056) is level when the bottom surfaces (1024) and (1032) are placed on the floor (1062) of a room. The back side of the lower shelf (1058) is substantially flush with the back side of the side posts (1020) and thus the wall (101) when the furniture (100) is positioned in contact with the wall (101). There is a distance between the back side of the lower shelf (1058) and the front of the lower shelf (1060) of sufficient dimension where the front side of the lower shelf (1060) extends to at least the front side of the side posts (1036 and 1034). This allows for a user to place objects, such as books (1203) on the shelf for storage.

As should be apparent, the presence of the lower shelf assembly (1042) enhances the concealed nature of the cables (1104) as the shelf (1042) is positioned in such a manner that the cables (104) could not be placed at the user's feet. The shelf (1056) is in the way and the wall (101) is visible behind the objects on the shelf (1056) with no cables (1104) being visible. Thus, a viewer of the furniture (100) sees the cables (1104) extend on the writing surface (1002) toward the back of the desk assembly (1038), pass into the desk assembly (1048), and effectively disappear. This implies that they have gone into the wall (101) as the wall (101) is visible above and below the desk assembly (1048), and the mounting board (1112) and concealment cover (1002) give the impression as being flush against the wall (101) leaving no other space in which the cables (1104) can be hidden. Thus, as opposed to prior designs which "hid" the cabling (1104) at the user's feet, the present design of FIG. 1 is such that such an arrangement is not possible, and the presence of the lower shelf (1042) makes the cables (1104) to appear even more concealed. Note that for symmetry purposes, the depicted embodiment of FIG. 1 also includes an upper shelf assembly (1044).

Because of the effect, tire concealment area (1046) is actually somewhat hard to see in FIG. 1. For this reason, FIG. 2 shows a perspective view of the lower portion of the furniture (100) with a concealment cover (1102) in place but with various sample components placed within it shown in shadow. A power strip (1100) can be seen in the concealment area (1046), and also seen is a power cord (1104) running vertically to the desk system (1048). The power cords (1104) are shown to include transformers at their plug portions which are also hidden. It should be recognized that placement of these types of objects on the pocket shelf (1038) can occur through various methods. In the depicted embodiment, the cables (1104) will generally all be placed on the pocket shelf (1038) and pulled up through the gap (1040), they can be plugged in to power strip (1100).

Alternatively, as contemplated previously, the cover (1102) may be removable or rotatable relative to the frame (110) to allow for access to the pocket shelf (1038). This arrangement would generally be preferred if there was no gap (1040), however, it is not necessary as the power components could be placed prior to attaching the furniture (100) to the wall (101). This provides even greater concealment, but also does not allow for the cables (1104) to be easily changed if needed.

Also depicted in FIG. 2 are fasteners (1106) such fasteners are, in some embodiments, used for attaching the mounting bracket (1112) to the wall (101). In certain embodiments, the fasteners (1106) are used to directly attach the mounting bracket (1112) to the existing wall (1050) and the writing surface (1110). In other embodiments, the fasteners (1106) are used to directly attach the mounting bracket (1112) to the existing wall (1050).

In certain embodiments the vertical side posts (1000) is constructed in multiple sections resulting in a seam (1108) which shows the mating of the two sections of the side post.

Although not described in detail, numerous other embodiments are possible in accordance with the present invention. Several of these embodiments are shown and depicted herein.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A piece of furniture comprising:
a first side support and a second side support, each of said first and said second side support being generally in the configuration of a rectangular prism and positioned generally in parallel with each other at opposing sides of said furniture, each of said first and said second side supports having a bottom weight-bearing surface and an opposing top surface with a length extending therebetween;
a writing surface perpendicularly attached to and extending between said first and said second side supports, said writing surface having a front side and an opposing back side and a depth extending therebetween, said writing surface attached to said first and said second side supports at a position such that an amount of said length disposed between said bottom weight-bearing surfaces and said writing surface is configured to accommodate a human user seated in a chair at said piece of furniture when bottom weight-bearing surfaces are on a floor;
a concealment compartment disposed below said writing surface and between said first side support and said second side support and having a front side and an opposing back side and a depth extending therebetween, said back side being an open space, defined laterally by said first side support and said second side support, such that when said piece of furniture is installed against a wall, said wall is generally flush with and generally closes said open back;
a storage compartment disposed between said writing surface and said concealment compartment;
an opening in said concealment compartment configured such that when cables are stored in said concealment compartment, said cables pass through said opening when plugged into a wall power receptacle;
a mounting bracket extending from said writing surface to said concealment compartment; and an opening at the top of said concealment compartment configured such that cables stored in said concealment compartment may be connected to devices on said writing surface;
wherein said concealment compartment depth is less than said writing surface depth so a human user seated in a chair at said piece of furniture is accommodated at said writing surface.

2. The furniture of claim 1, wherein said front side of said concealment compartment comprises a removable cover.

3. The furniture of claim 1, wherein said piece of furniture is mounted to a wall using said mounting bracket.

4. The furniture of claim 3, wherein said mounting bracket comprises mounting holes spaced about four inches apart.

5. The furniture of claim 1 wherein said concealment compartment is configured to accommodate a plurality of transformer blocks connected to power strip therein.

\* \* \* \* \*